United States Patent [19]

Aslen

[11] 4,162,647
[45] Jul. 31, 1979

[54] MILLING MACHINE GUARD

[76] Inventor: Douglas E. Aslen, 16 Pinfold La., Romiley, Cheshire, England

[21] Appl. No.: 806,558

[22] Filed: Jun. 14, 1977

[30] Foreign Application Priority Data

Jun. 17, 1976 [GB] United Kingdom ............... 25074/76

[51] Int. Cl.² ................................. B23C 9/00
[52] U.S. Cl. ............................. 409/64; 29/DIG. 86; 408/241 G
[58] Field of Search ................... 90/11 R; 408/241 R, 408/241 G, 710; 51/268, 272; 144/251 R, 251 A, 134 A; 29/DIG. 56, DIG. 86; 83/860

[56] References Cited

U.S. PATENT DOCUMENTS

| 498,263 | 5/1893 | Henry | 144/251 A |
| 1,072,401 | 9/1913 | Offut | 83/860 |
| 2,785,716 | 3/1957 | Lutton | 144/251 A |
| 3,105,530 | 10/1963 | Peterson | 144/251 R X |
| 3,871,260 | 3/1975 | Rees | 144/251 A |

Primary Examiner—John Sipos
Attorney, Agent, or Firm—Pearson & Pearson

[57] ABSTRACT

A guard for a milling machine comprises a combination of rods and blocks for supporting guard panels relative to the milling tool to provide for an adjustment of the panels relative to the tool axially of such tool. A plurality of mounting bars extend away from the tool area in a plane, each supporting one of a set of mounting blocks. A pair of support rods extend in that plane each from an opposite side of a mounting block, and each transverse to its mounting bar. A pair of support blocks each support one of a pair of guard panels.

19 Claims, 6 Drawing Figures

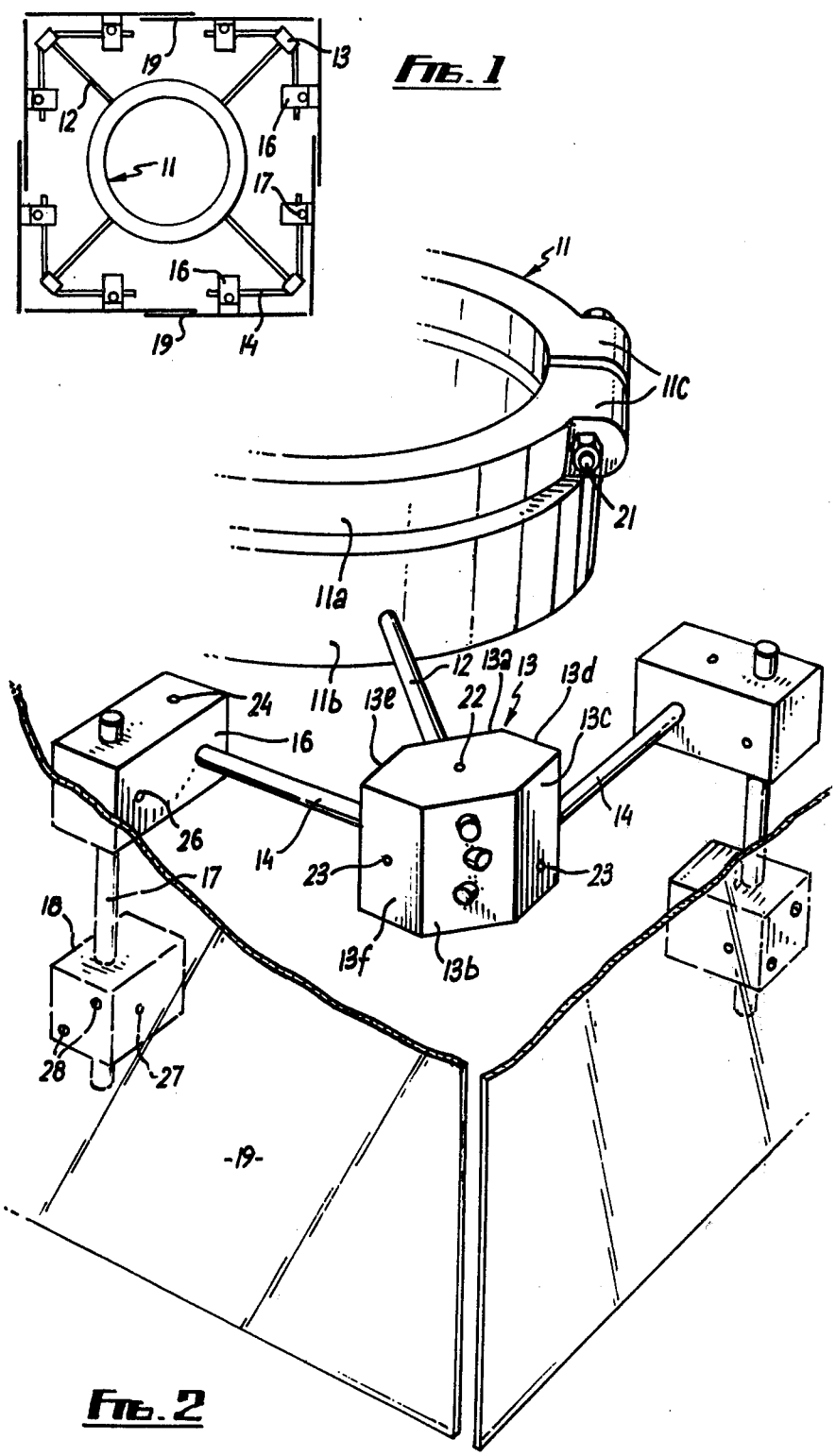

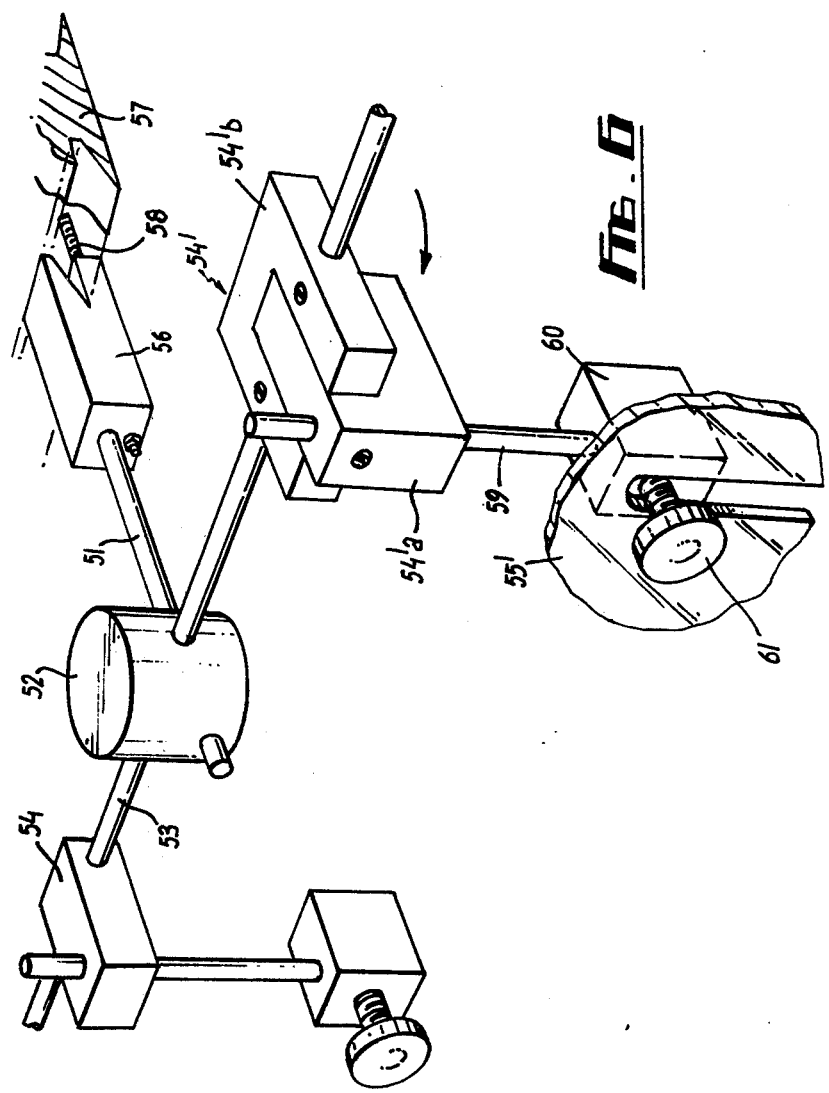

MILLING MACHINE GUARD

The invention concerns milling machine guards, and has more particular reference to a guard intended to provide a barrier between a milling cutter and workpiece (or the relevant part thereof) on the one hand and a machine operator on the other.

It is known in the art to provide a milling machine guard which is mounted on the machine table and which moves with such table as the latter traverses relative to the milling tool. Whilst such known guard is adjustable according to the dimension of the workpiece in question, and has clear-view panels thereby to make visible the workpiece at least in the region of the cutting tool, the extent of adjustment is limited, and maximum adjustment in the direction of machine table movement is achieved at the expense of protection transversely of such direction of movement. Furthermore, the mounting of the guard on the table is often inconvenient in as much as this interferes with a proper location of the workpiece.

It is also known to provide a guard which is secured to the quill of the milling machine, such guard comprising a cylindrical or part-cylindrical skirt which extends downwardly from the quill about the periphery of the milling cutter. This type of guard has the obvious shortcoming that although there is protection against the operator coming into contact with the milling cutter, the material cut from the workpiece is in no sense confined. A guard secured to the dovetail of the overarm of the milling machine is also known.

The object of the present invention is to provide a guard for a milling machine, whether of the vertical or horizontal kind, which will preclude the operator from coming into contact with the milling cutter and which will also confine the material removed from the workpiece during the milling operation.

According to the present invention there is proposed a guard for a milling machine which includes a mounting bar adapted to be secured to a milling machine to extend transversely of the rotational axis of the milling cutter thereof, a mounting block on such mounting bar, a support rod extending from such block and having at least a part extending transversely of the mounting bar, a support block movably mounted on such rod and adjustable axially thereof, and a guard panel supported by and adjustable relative to the said support block for movement in a direction generally perpendicular to the axes of the mounting bar and the support rod.

According to a preferred feature, the guard panel is supported by and is adjustable relative to the support block via a mounting rod slidably mounted in the support block and an attachment block slidable on the mounting rod and to which the said panel is attached.

According to a further preferred feature, the guard is secured to the milling machine via an attachment collar mountable on the quill of such milling machine, and the mounting bar extends radially outwardly from such collar.

In one preferred arrangement, the guard includes four mounting bars arranged in equally spaced angular disposition about the axis of the attachment collar, there being a mounting block, support block, support rod and guard panel on each such mounting bar.

The invention will now be described further, by way of example only, with reference to the accompanying drawing illustrating several embodiments and in which:

FIG. 1 is a diagrammatic plan view of a guard for a vertical milling machine constructed in accordance with the invention;

FIG. 2 is a diagrammatic perspective view, drawn to a larger scale, of a corner of the guard of the kind shown in FIG. 1;

FIG. 6 is a diagrammatic perspective view of a part of the arrangement shown in FIG. 5.

Figure 3:
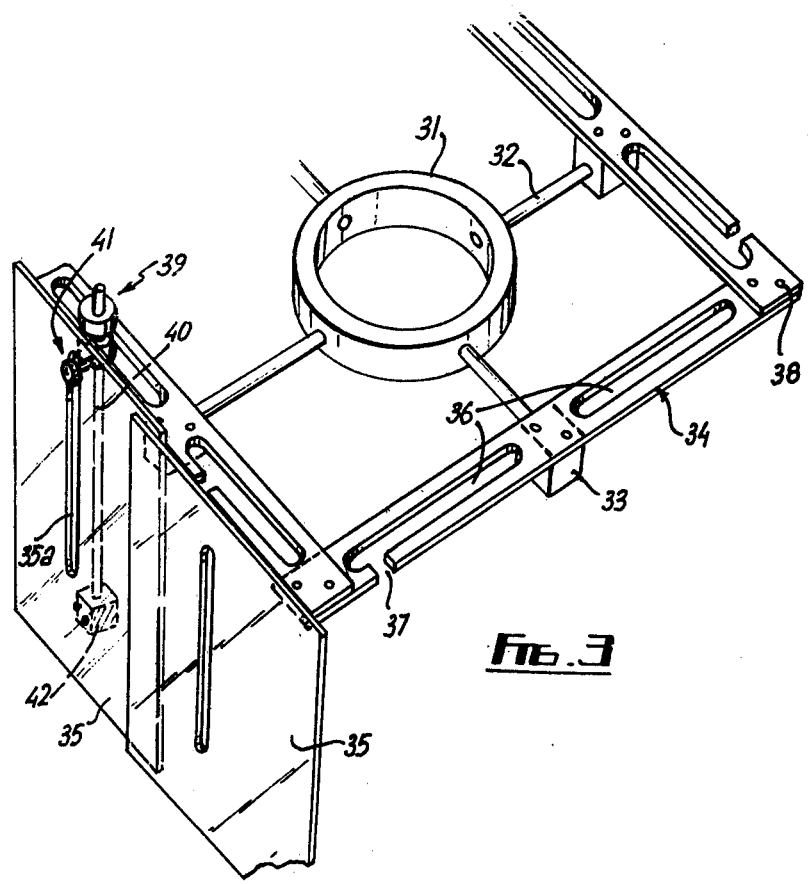
FIG. 3 is a perspective view of a second embodiment of the invention as applied to the context of a guard for a vertical milling machine; certain parts being omitted in the interests of clarity.

Referring now to the drawings, and particularly to FIGS. 1 and 2 thereof, a guard for a vertical milling machine comprises an attachment collar 11 releasably attachable to the quill of the milling machine, a plurality of mounting bars 12 extending outwardly from the said collar 11 and arranged in angularly spaced disposition about the periphery thereof, a respective mounting block 13 slidably mounted on each mounting bar 12, two support rods 14 slidably engaged with each such mounting block 13 and extending outwardly from such block in respective and mutually inclined directions, a support block 16 slidable on each support rod 14, a respective mounting rod 17 slidably engaged with each support block 16, and a respective attachment block 18 slidably mounted on each mounting rod 17, the said attachment blocks 18 being releasably secured to respective guard panels 19 which collectively define a depending skirt arranged about the milling cutter when the guard is applied to a milling machine.

The mounting bars 12 and support rods 14 are, in the use position of the guard, disposed generally horizontally, whilst the mounting rods 17 are arranged generally vertically.

The arrangement is illustrated in greater detail in FIG. 2, such figure showing a corner region of the guard and it will be appreciated that the structure shown in FIG. 2 will be repeated at each of the other corners of the total structure. Thus, the collar 11 comprises upper and lower parts 11a,11b arranged in spaced-apart, coaxial relationship, the upper part 11a being split and lugs 11c being provided at either side of the radial opening in such part to receive a clamping bolt 21 for securing the collar 11 to the quill of the milling machine. The inner diameter of the lower part 11b of the collar exceeds that of the upper part 11a thereof so as freely to receive the quill, and the said upper and lower parts 11a,11b being connected together at a position diametrically opposite the radial opening in the upper such part.

The lower part 11b of the collar has radially directed through holes therein, each to receive a respective one of the mounting bars 12, and a screw means (not shown) is provided in such lower part for abutment with a flat at the underside of the bar to secure such bar 12 relative to the collar 11.

The mounting block 13 is of hexagonal shape, when viewed in plan, two opposed faces 13a,13b of such block lying at right angles to the axis of the mounting bar 12, whilst the remaining faces 13c,13d,13e,13f are inclined to such axis at an angle of 45° to lie parallel to the planes of the guard panels 19. Three through holes are provided in the mounting block in spaced apart relationship in the vertical direction thereof, the axes of such holes being parallel to the planes of the top and bottom surfaces 13g,13h of such block, one such hole extending between the two opposed faces 13a,13b aforesaid and being intended to receive the mounting bar 12 into engagement therewith, and the other holes extend between face 13b and a non-adjacent one, 13d,13e, of the inclined faces. Screw means 22, 23 are provided for abutment with the mounting bar 12 and support rods 14 to locate such elements in a requisite position relative to the mounting block 13.

Each support block 16 is generally rectangular and has a first through bore therein to receive the support rod 14, and a second through bore to receive the mounting rod 17, the axes of the first and second through bores thus being mutually perpendicular. Screw means 24,26 are provided for securing the block 16 in position on the support rod 14 and for securing the mounting rod 17 in a requisite axial position relative to the block 16, respectively.

The attachment block 18 has a single through bore therein to receive the lower end of the mounting rod 17, there being screw means 27 for securing such block 18 in position on the rod 17, and tapped holes are formed in one face of the block to receive screws 28 whereby the guard panel 19 is secured thereto.

The slidable mounting of the mounting block 13 on the mounting bar 12 will provide for the adjustment of the position of such block 13 radially of the rotational axis of the milling cutter as determined by the specific requirements of the situation.

Similarly, lateral adjustment of the guard panels 19 can be effected by movement of the support block 16 on the support rod 14, whilst vertical adjustment of such panels 19 requires a movement of the attachment block 18 axially of the mounting rod 17.

By means of the arrangement herein proposed we are able to adjust the form and dimensions of the guard to meet particular requirements within the limits imposed by the extent to which the panels overlap, or can be overlapped (see FIG. 1), and by the vertical dimensions of the panels, yet still maintain a substantially complete shield about the cutter.

Figure 4:
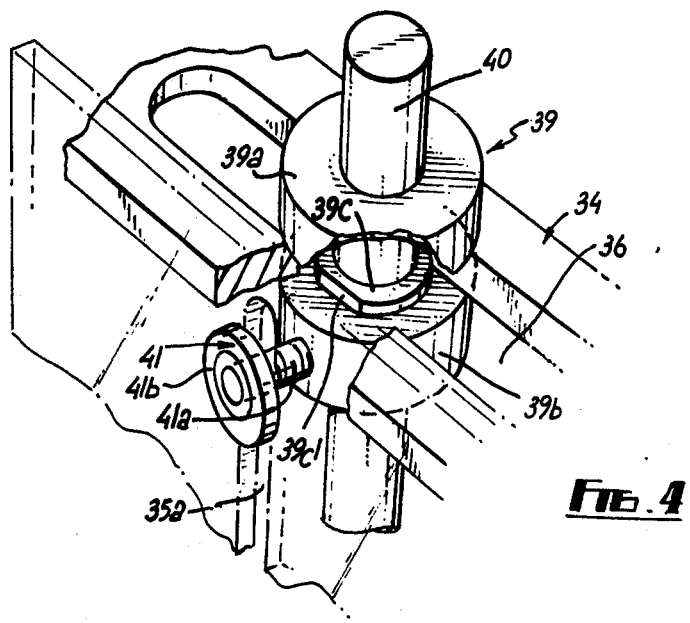
FIG. 4 is a perspective view, drawn to a larger scale, of a part of the arrangement shown in FIG. 3.

An alternative to the arrangement shown in FIGS. 1 and 2 is illustrated in FIGS. 3 and 4, a slotted support frame being provided for attachment to the quill of the milling machine, and guard panels being adjustably supported relative to such frame. Thus, referring now to FIGS. 3 and 4, the guard comprises a collar 31 for attachment to the milling machine quill (not shown), a plurality of mounting bars 32 extending radially from such collar in equi-spaced angular disposition thereabout, a respective mounting block 33 at the end of each mounting bar 32, and a respective slotted guide rail 34 on each block 33, the ends of the guide rails 34 being secured together to give a rigid support frame on which the guard panels 35 are mounted.

Each guide rail 34 consists of a flat bar arranged in a generally horizontal plane and secured at its mid-point to the upper face of the related mounting block 33, there being an elongate slot 36 in the rail 34 at each side of the said mounting block. A transverse entrance opening 37 is provided in respect of one elongate slot in each guide rail for a purpose hereafter to be made apparent.

In the embodiment illustrated, three guide rails 34 are shown, although the support frame may be formed by four such rails to give a closed structure, and the ends of successive guide rails are arranged in overlying disposition and are secured together as by rivets or screws 38.

A respective support block arrangement 39 is provided in each elongate slot 36, the block arrangement 39 being adjustable longitudinally of the slot and having a through bore thereto for receiving a mounting rod 40 into free sliding engagement therewith, a locking means 41 being provided in the block arrangement for engagement with the rod 40 to secure the same in a requisite position axially of the rod.

The support block arrangement 39 comprises upper and lower generally cylindrical parts 39a,39b arranged in coaxial disposition and connectable together via complementarily screw-threaded parts thereon, there being a step 39c at the upper face of the lower part 39b for engagement with the slot 36, such step having flats $39c^1$ thereon for engagement with the walls of the slot to secure the block arrangement against rotation relative thereto.

The locking means 41 comprises a locking screw 41a located in a radially directed, screw-threaded hole in the lower part 39b of the block arrangement 39, the screw having a handwheel 41b at its outer end and the inner end thereof abutting the mounting rod 40.

An attachment block 42 is secured to the lower end of the mounting rod 40, and the panel 35 is attached to such block 42 for adjustment therewith in the longitudinal direction of the rod.

A slot 35a is provided in the panel 35 in aligned, parallel disposition relative to the mounting rod 40, the slot being clearance on the shank of the locking screw 41a which extends therethrough and allowing of the adjustment of the panel in a vertical direction.

The entrance opening 37 is of such dimensions as to allow of the introduction of the support block arrangement into slot 36 through such opening, thereby permitting of the ready removal of a panel as and when desired.

As will readily be apparent, adjustment of the positions of the panels axially of the milling tool can readily be effected by adjustment of the mounting rod 40 relative to the support block arrangement and by adjustment of such arrangement longitudinally of the slot 36, and thus the dimensions and disposition of the guard can be varied to suit particular requirements.

Figure 5:
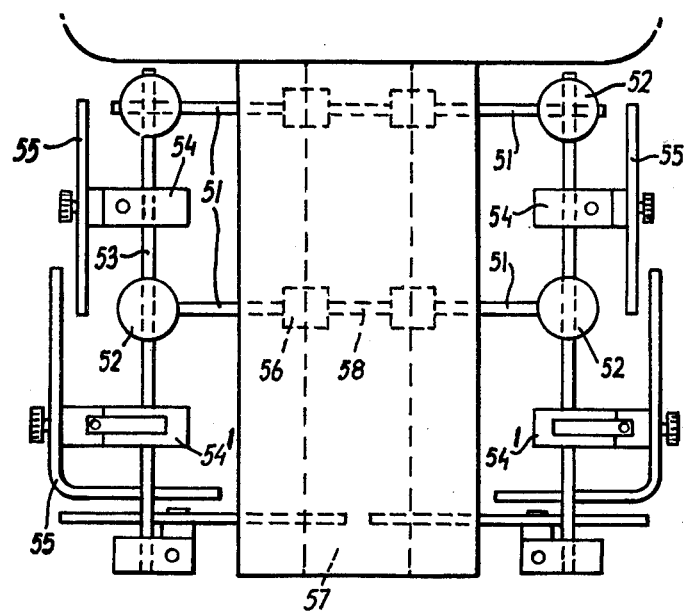
FIG. 5 is a diagrammatic plan view of a third embodiment of the invention and shows the same in the context of a guard for an horizontal milling machine.

A milling machine guard constructed in accordance with the invention can be provided for use in the context of an horizontal milling machine, a typical such guard being shown in FIGS. 5 and 6 of the drawings.

Referring now to FIGS. 5 and 6, a guard for an horizontal milling machine comprises a plurality of mounting bars 51 extending transversely of the head of the machine at each side thereof, a mounting block 52 on each such mounting bar 51, a support rod 53 at each side of the machine head mounted in the blocks 52 at such side, and support blocks 54,$54^1$ on the said support rods 53 by which panels 55 are mounted relative to the milling tool.

Corresponding mounting bars 51 at the opposite sides of the machine head are arranged in axial alignment, and each is secured to a respective clamping block 56 engaged with one side of the dovetail guide 57 of the machine head, the opposed such clamping blocks 56 being secured together and clamped on the said guide 57 by a clamping bolt 58.

The support blocks 54,$54^1$ each receive a mounting rod 59 into engagement therewith and a respective attachment block 60 is provided on each rod 59 and is slidable thereon. A locking screw 61 secures the block 60 relative to the rod 59, such screw extending through the panel 55 and serving to attach such panel to the block.

Support block 54¹ includes a pivotal central portion 54¹a with which the rod 59 is engaged, the said central portion 54¹a being pivotal on support rod 53 and being angularly located thereon and relative to the fixed portion 54¹b of the block 54¹ by ball catch means (not shown) between adjacent faces of the portions 54¹a, 54¹b of the support block. As will be appreciated, the pivotal character of support block 54¹ will allow of the pivotal displacement of the panel 55 carried thereby, thus to provide for a ready access to the workpiece in the region of the milling cutter or to allow of a displacement of the panel in the event of an excessive build-up of swarf from the milling operation.

Conveniently, the guard panel 55¹ carried by support block 54¹ will be of angled form to provide a check at one or both sides thereof, such that, as the panel is pivoted upwardly from its initial use position, the guard will remain complete at the forward end of the machine head.

The invention is not limited to the exact features of the embodiments disclosed since alternatives will readily present themselves to one skilled in the art. Thus, for example, the guard is not limited to the rectangular configuration illustrated, since curved panels could be used to give a sensibly cylindrical guard, the support rods of such an arrangement conveniently being arcuate rather than straight.

In another arrangement, the mounting bar and related support rods are formed integrally, and the mounting block as illustrated is omitted, radially adjustment being provided for by using a two piece mounting bar, the forward end of which is of generally T-shape, and the two parts of which are connected together through a block relative to which at least one of the two parts is axially adjustable.

In a modification of the arrangement shown in FIGS. 1 and 2 of the drawings, the mounting bars extend outwardly from the collar so as to be perpendicular to the plane of the panel, and the mounting block has a support rod extending from each side thereof, there being respective support blocks, mounting rods and attachment blocks on each such support rod. In a development of this modification, the support rods and mounting rods are combined to form an element of inverted T-shape, such element being slidably engaged with the mounting block and an attachment block being slidable on each of the transverse limbs of the element.

In each embodiment shown in the drawings it should be noted that the mounting bars each extend away from the tool area in a plane, that each support rod extends substantially in the same plane, that there are a pair of such support rods each on an opposite side of a mounting block 13, 33 or 52, that there are a pair of support blocks such as 16, 39 or 54, each movably mounted on a support rod and adjustable axially thereof and that there are a pair of panels such as 19, 35 or 55, each supported by, and adjustable, relative to its support block for movement in a direction generally perpendicular to the axes of its mounting bar and support rod and normal to the plane thereof.

What I claim is:

1. In a milling machine having a rotatable milling cutter including a guard which comprises, a mounting block on such mounting bar, a pair of support rods each extending from such block substantially in said plane, on an opposite side of said block and each having at least a part extending transversely of the mounting bar, a pair of support blocks, each movably mounted on one of said support rods and adjustable axially thereof, and a pair of guard panels, each supported by and adjustable relative to one of the said support blocks for movement in a direction generally perpendicular to the axes of its mounting bar and its support rod and normal to the said plane thereof.

2. In a machine as claimed in claim 1, wherein each guard panel is supported by and is adjustable relative to one of said support blocks via a mounting rod slidably mounted in the support block and an attachment block slidable on the mounting rod and to which the said panel is attached.

3. In a machine as claimed in claim 1, wherein the support rod comprises a slotted bar.

4. In a machine as claimed in claim 3, wherein the support block is engaged with a respective slot in the support rod.

5. In a machine as claimed in claim 1, wherein clamping blocks are provided from which the mounting bars extend, the blocks being adapted for engagement with the dovetail guide of an horizontal milling machine.

6. In a machine as claimed in claim 1, wherein the support blocks include a support block having a pivotally mounted part whereby the panel associated therewith is pivotal from its initial operative position.

7. In a machine as claimed in claim 6, wherein ball-catch means are provided for locating the movable panel in an initial operative position.

8. In a machine as claimed in claim 6, wherein the pivotal panel has a side cheek or cheeks thereto thus to maintain the integrity of the guard when such panel is pivoted away from its initial operative position.

9. A guard for a milling machine comprising a mounting bar adapted to be secured to a milling machine to extend transversely of the rotational axis of the milling cutter thereof, a mounting block on such mounting bar, a guide rail extending from such block and having at least a part extending transversely of the mounting bar, a support block movably mounted on such rail and adjustable longitudinally thereof, and a guard panel supported by and adjustable relative to the said support block for movement in a direction generally perpendicular to the longitudinal axes of the mounting bar and the guide rail comprising a slotted flat bar, and the support block being engaged with a respective slot in the said bar to extend therethrough, said support block comprises two complementary members arranged at opposite sides of the guide rail and engaged with the slot therein, the complementary members being secured together to clamp the guide rail therebetween and wherein a mounting rod is engaged with the support block and extends through the complementary members defining such support block, said slotted bar is disposed with the plane defined thereby extending generally horizontally when the guard is in use, and wherein the mounting rod extends through the said complementary members and through the slot.

10. A guard as claimed in claim 9, wherein the guard is secured to the milling machine via an attachment collar mountable on the quill of such milling machine, and the mounting bar extends radially outwardly from such collar.

11. A guard as claimed in claim 1, wherein the guide rail extends at either side of the mounting block.

12. A guard as claimed in claim 11, wherein a respective entrance opening is provided in the bar to provide access to each slot therein.

13. A guard as claimed in claim 9, wherein the support block is non-rotatably mounted in said slot.

14. A guard as claimed in claim 9, wherein a mounting rod is engaged with the support block and is slidable relative thereto, locking means being provided for locating the mounting rod axially relative to the support block.

15. A guard as claimed in claim 14, wherein an attachment block is provided on the mounting rod and in fixed disposition relative thereto, the panel being secured to such attachment block.

16. A guard as claimed in claim 15, wherein a slot is provided in the panel, the locking means including a screw extending outwardly of the support block through the slot and the panel being movable relative to such locking means within limits imposed by the slot.

17. A guard as claimed in claim 9, wherein the slotted bar is disposed with the plane defined thereby extending generally horizontally.

18. A guard as claimed in claim 9, wherein a flat side is provided on one of the complementary members which together with the other of said complimentary members constitute the support block for cooperation with the slot to secure the said block against rotation in the slot.

19. A guard as claimed in claim 9, wherein the said complementary parts include cooperating screw-threaded means adapted upon mutual engagement to secure the support block in clamping relationship with the guide rail.

* * * * *

UNITED STATES PATENT OFFICE
CERTIFICATE OF CORRECTION

Patent No. 4,162,647　　　　　　　　　Dated July 31, 1979

Inventor(s) Douglas E. Aslen

It is certified that error appears in the above-identified patent and that said Letters Patent are hereby corrected as shown below:

Omitted from Claim 1, line 67 after "mounting", and before "block" line 68 was the following:

"bar secured to said milling machine and positioned in a plane extending transversely of the rotational axis of the milling cutter, a mounting"

Signed and Sealed this

Nineteenth Day of August 1986

[SEAL]

Attest:

Attesting Officer

DONALD J. QUIGG

Commissioner of Patents and Trademarks